(12) United States Patent
Kando et al.

(10) Patent No.: US 12,038,216 B2
(45) Date of Patent: Jul. 16, 2024

(54) ICE MAKING MACHINE

(71) Applicants: MAYEKAWA MFG. CO., LTD., Tokyo (JP); ICEMAN CORPORATION, Kurume (JP)

(72) Inventors: Masanori Kando, Tokyo (JP); Akira Kishimoto, Tokyo (JP); Toshio Kutsuna, Tokyo (JP); Takumi Shirato, Tokyo (JP); Masaki Katami, Tokyo (JP); Tomoaki Akiyama, Kurume (JP); Reina Akiyama, Kurume (JP); Bo Hu, Iizuka (JP); Keito Akiyama, Kurume (JP); Tetsuji Inoue, Kurume (JP)

(73) Assignees: MAYEKAWA MFG. CO., LTD., Tokyo (JP); ICEMAN CORPORATION, Kurume (JP)

( * ) Notice: Subject to any disclaimer, the term of this patent is extended or adjusted under 35 U.S.C. 154(b) by 336 days.

(21) Appl. No.: 17/610,623

(22) PCT Filed: May 15, 2020

(86) PCT No.: PCT/JP2020/019392
§ 371 (c)(1),
(2) Date: Nov. 11, 2021

(87) PCT Pub. No.: WO2020/230879
PCT Pub. Date: Nov. 19, 2020

(65) Prior Publication Data
US 2022/0316781 A1  Oct. 6, 2022

(30) Foreign Application Priority Data
May 15, 2019  (JP) .................................. 2019-092070

(51) Int. Cl.
*F25C 1/147*  (2018.01)
*F25B 9/00*  (2006.01)

(52) U.S. Cl.
CPC .............. *F25C 1/147* (2013.01); *F25B 9/008* (2013.01); *F25C 2400/10* (2013.01);
(Continued)

(58) Field of Classification Search
CPC .. F25C 1/147; F25C 2400/10; F25C 2400/14; F25C 2600/04; F25C 2700/00; F25C 1/12; F25B 9/008
(Continued)

(56) References Cited

U.S. PATENT DOCUMENTS

2003/0200758 A1  10/2003  Nakano et al.
2007/0234753 A1  10/2007  Nemoto et al.
2018/0340721 A1*  11/2018  Hirokane .................. F25D 3/10

FOREIGN PATENT DOCUMENTS

CN          2804740      8/2006
CN        204739800    11/2015
(Continued)

OTHER PUBLICATIONS

Chinese Office Action (w/ partial English translation) for corresponding Chinese Application No. 202080033943.8, mailed Aug. 8, 2022, 10 pages.
(Continued)

*Primary Examiner* — Steve S Tanenbaum
(74) *Attorney, Agent, or Firm* — Dority & Manning, P.A.

(57) ABSTRACT

This ice making machine includes an ice making unit that includes an ice making surface and a cryogen flow channel through which a cryogen for cooling the ice making surface flows; a pump that pressurizes and discharges the cryogen cooled by a heat exchanger; and a control unit that controls a discharge amount of the pump. The cryogen is carbon dioxide, and the control unit controls the pump such that the cryogen is in a gas-liquid mixed state at an outlet of the cryogen flow channel.

7 Claims, 6 Drawing Sheets

(52) U.S. Cl.
    CPC ...... *F25C 2400/14* (2013.01); *F25C 2600/04* (2013.01); *F25C 2700/00* (2013.01)

(58) Field of Classification Search
    USPC .......................................................... 62/340
    See application file for complete search history.

(56) References Cited

FOREIGN PATENT DOCUMENTS

| | | | |
|---|---|---|---|
| EP | 2570752 | A1 | 3/2013 |
| JP | 2001201118 | A | 7/2001 |
| JP | 2006-110416 | | 4/2006 |
| JP | B-6215742 | | 10/2015 |
| JP | 2016-080254 | | 5/2016 |
| JP | 2016080254 | A * | 5/2016 |
| JP | 2017-072358 | | 4/2017 |
| JP | 6294403 | B2 | 3/2018 |
| JP | 2018-071835 | | 5/2018 |
| JP | 2018071835 | A * | 5/2018 |
| JP | 2018-159483 | | 10/2018 |

OTHER PUBLICATIONS

PCT International Search Report (w/ English translation) for corresponding PCT Application No. PCT/JP2020/019392, mailed on Aug. 4, 2020, 5 pages.
European Search Report for corresponding European Application No. 20806710.8, Dec. 13, 2022, 4 Pages.
Korean Office Action (w/ English translation) for corresponding KR Application No. 10-2021-7036683, dated Jul. 4, 2023, 10 pages.
Decision of Patent Grant (w/ English translation) for corresponding Korean Application No. 10-2021-7036683, mailed Jan. 3, 2024, 4 pages.

* cited by examiner

ICE MAKING MACHINE

TECHNICAL FIELD

The present invention relates to an ice making machine for freezing water to produce ice.

The present application is a national phase entry of International Patent Application No. PCT/JP2020/019392 filed on May 15, 2020, which is based upon and claims the right of priority to Japanese Patent Application No. 2019-092070, filed May 15, 2019, the contents of both of which are incorporated herein by reference in their entirety for all purposes.

BACKGROUND ART

In the related art, an ice making machine in which water is sprinkled on an ice making surface of an ice making unit cooled with a refrigerant or a cryogen, and thus ice is grown to a certain thickness on the ice making surface, and then the ice is dropped from the ice making surface to produce ice is known.

For example, in Patent Literature 1, an ice making machine in which chlorofluorocarbons are used as a refrigerant, liquefied chlorofluorocarbons are circulated inside an ice making plate, which is an ice making unit, ice is grown on a surface of the ice making plate, and then the ice is dropped from the ice making plate is disclosed. In this type of ice making machine, a flow rate is set such that almost all of the chlorofluorocarbons are liquid at an inlet of a refrigerant flow channel, the chlorofluorocarbons take away heat of the ice making unit to be vaporized as the chlorofluorocarbons flow through the refrigerant flow channel, and almost all of the chlorofluorocarbons become gas at an outlet of the refrigerant flow channel.

CITATION LIST

Patent Literature

Patent Literature 1

Japanese Patent No. 6215742

SUMMARY OF INVENTION

Technical Problem

The ice making machine described in Patent Literature 1 has room for improvement in producing high-quality ice while saving energy. That is, as in Patent Literature 1, in a direct expansion type using the chlorofluorocarbons as the refrigerant (hereinafter referred to as a "chlorofluorocarbon direct expansion type"), to prevent liquid back in which the refrigerant is sucked into a compressor in a liquid state, it is necessary to adjust a degree of superheat (a temperature difference between a superheated steam temperature and a dry saturated steam temperature under a certain pressure) such that the refrigerant is completely vaporized near the outlet of the refrigerant flow channel. For this reason, a temperature difference of the refrigerant occurs between the inlet and the outlet of the refrigerant flow channel, which causes uneven ice making.

Further, in the chlorofluorocarbon direct expansion type, freezing machine oil is inevitably mixed with the refrigerant, and the freezing machine oil adheres to an inner surface of the refrigerant flow channel and hinders heat transfer, and thus heat transfer efficiency is lowered to that extent.

In addition to the chlorofluorocarbon direct expansion type, in the related art, an ice making system using brine such as propylene glycol or ethylene glycol is known, but since the brine has high viscoelasticity, pressure loss of the brine is likely to become large when the brine flows through the ice making plate. When the pressure loss of the brine in the ice plate becomes large, channeling is likely to occur in the ice making plate, and thus it is necessary to increase a flow rate for the purpose of suppressing the channel and transport power increases. In addition, the brine is toxic and is not suitable for making ice for food.

An object of the present invention is to provide an ice making machine in which ice making unevenness on the ice making surface can be decreased, ice production efficiency can be increased, energy can be saved, and high quality ice can be produced.

Solution to Problem

[1] According to an aspect of the present invention, there is provided an ice making machine including an ice making unit that includes an ice making surface and a cryogen flow channel through which a cryogen for cooling the ice making surface flows; a water supply mechanism that supplies water to the ice making surface; a heat exchanger for cooling the cryogen flowing out from an outlet of the cryogen flow channel; a pump that pressurizes and discharges the cryogen cooled by the heat exchanger; and a control unit that controls a discharge amount of the pump, wherein the cryogen is carbon dioxide, and wherein the control unit controls the pump such that the cryogen is in a gas-liquid mixed state at the outlet of the cryogen flow channel. The ice making machine may further include a pressure reducing valve that reduces a pressure of the cryogen discharged by the pump and injects the cryogen from an inlet of the cryogen flow channel.

According to the ice making machine of the above aspect, carbon dioxide is used as the cryogen, and the pump is controlled such that the cryogen is in a gas-liquid mixed state at the outlet of the cryogen flow channel, and thus liquid carbon dioxide supplied to the cryogen flow channel of a cooling unit passes through the cryogen flow channel while leaving the liquid portion. In this way, the liquid carbon dioxide remains until it reaches the outlet of the cryogen flow channel, and thus the cooling unit is cooled mainly using the latent heat of the liquid carbon dioxide.

For this reason, as compared with a case in which it is necessary to adjust a degree of superheat and the refrigerant is completely vaporized near an outlet of a refrigerant flow channel as in the chlorofluorocarbon direct expansion type, it is possible to circulate the cryogen in the gas-liquid mixed state to the outlet of the cryogen flow channel, and thus uneven cooling is unlikely to occur over the entire length of the cryogen flow channel. Therefore, temperature distribution and cooling can be made substantially uniform over the entire area of the ice making surface constituted by the cooling units, and the water can be frozen with a thickness having little variation over the entire area of the ice making surface. Accordingly, it is possible to produce ice having a uniform thickness and a uniform ice quality.

In addition, unlike the chlorofluorocarbon direct expansion type, the freezing machine oil does not enter the cryogen flow channel of the ice making unit, and thus heat transfer performance does not deteriorate due to the adhesion of the freezing machine oil to the inner surface of the cryogen flow channel, and energy can be saved. Since the latent heat of the liquid carbon dioxide is mainly used for cooling, a freezing rate when ice is generated on the ice making surface is relatively slow and bubbles and impurities in water are less likely to be taken into the ice, and thus it is possible to make high quality ice having high transparency, which is an excellent effect.

[2] In the aspect of [1], in a case in which the discharge amount of the pump at which a total amount of the carbon dioxide is liquid at an inlet of the cryogen flow channel and a total amount of the carbon dioxide becomes gas at the outlet of the cryogen flow channel is a total vaporization critical discharge amount, the control unit may control the pump such that the discharge amount of the pump is 1.6 times or more the total vaporization critical discharge amount. Because the discharge amount of the pump is controlled to be 1.6 times or more the total vaporization critical discharge amount, 0.6/1.6=37.5% or more of the liquid carbon dioxide supplied to the cryogen flow channel of the cooling unit passes through the cryogen flow channel in a liquid state. In this way, a relatively large amount of liquid carbon dioxide exceeding 37.5% remains until it reaches the outlet of the cryogen flow channel, and thus the latent heat of the liquid carbon dioxide can be utilized over the entire length of the cryogen flow channel. Therefore, cooling can be performed almost uniformly over the entire ice making surface.

[3] In the aspect of [1] or [2], the discharge amount of the pump may be 1.6 times or more and 5 times or less the total vaporization critical discharge amount. In this case, it is not necessary to increase pressure resistance strength of circulation system equipment such as the ice making unit and the pressurizing pump so much, and thus cost performance including equipment cost is good. The discharge amount of the pump may be 1.6 times or more and 3.0 times or less the total vaporization critical discharge amount.

[4] In the aspects of [1] to [3], the ice making machine having the above configuration may further include a receiver tank that stores the carbon dioxide that is cooled and liquefied by the heat exchanger.

With the receiver tank provided, even if the cryogen is in a gas-liquid mixed state, the cryogen can be vertically separated into gas and liquid in the receiver tank by gravity, and only the liquid cryogen can be circulated to the cryogen flow channel using the pump.

[5] In the aspects of [1] to [4], the heat exchanger may have a primary refrigerant flow channel through which a cooled primary refrigerant passes and a cryogen flow channel through which the cryogen passes and may exchange heat between the primary refrigerant passing through the primary refrigerant flow channel and the cryogen passing through the cryogen flow channel, and the ice making machine may further include a primary refrigerant cooler for supplying the primary refrigerant to the primary refrigerant flow channel. As the primary refrigerant, for example, liquid ammonia or the like can be used to efficiently cool the cryogen.

[6] In the aspects of [1] to [5], the ice making machine may further include a sensor that measures a physical quantity of the cryogen flowing out from the outlet of the cryogen flow channel and outputs a signal corresponding to a gas-liquid mixing ratio of the cryogen, and the control unit nay feedback-control the pump such that the discharge amount of the pump is 1.6 times or more the total vaporization critical discharge amount in response to the signal from the sensor. In this case, even if the water temperature or the outside air temperature changes, it becomes easy to autonomously keep the discharge amount of the pump within a certain range of 1.6 times or more the total vaporization critical discharge amount, and ice growth conditions are constant. Therefore, it is possible to prevent variations in an ice quality.

[7] In the aspects of [1] to [6], the ice making unit may have a cylindrical cooling drum, the cryogen flow channel may be formed inside the cooling drum, and the ice making surface may be formed on an inner surface of the cooling drum, the water supply mechanism may have a nozzle that sprinkles water on the ice making surface of the cooling drum while rotating around a center line of the cooling drum, and the ice making machine may further include a crusher for crushing ice adhering to the ice making surface of the cooling drum. In this case, it is possible to continuously perform a process of sprinkling water from the water supply mechanism on the ice making surface which is the inner surface of the cooling drum, growing ice on the ice making surface, and then crushing the ice adhering to the ice making surface with a crusher. Therefore, it is possible to continuously produce high-quality ice with high production efficiency.

[8] In the aspects of [1] to [7], the ice making unit may have an ice making plate having the cryogen flow channel inside, one surface of the ice making plate may be an ice making surface, and another surface of the ice making plate may be a heat medium supply surface, and the ice making machine may further include a heat medium supplier that supplies a heated heat medium to the heat medium supply surface. In this case, water is supplied to the ice-making surface of the ice making plate to grow ice, and when the ice grows to a certain thickness, a heated heat medium is supplied to the heat medium supply surface of the other surface of the ice making plate, and thus the ice adhering to the ice making surface is dropped. Therefore, it is possible to intermittently produce high quality ice with high productivity.

Advantageous Effects of Invention

According to the ice making machine of the present invention, ice making unevenness on the ice making surface can be decreased, ice production efficiency can be increased, energy can be saved, and high quality ice can be produced.

DESCRIPTION OF EMBODIMENTS

Figure 1:
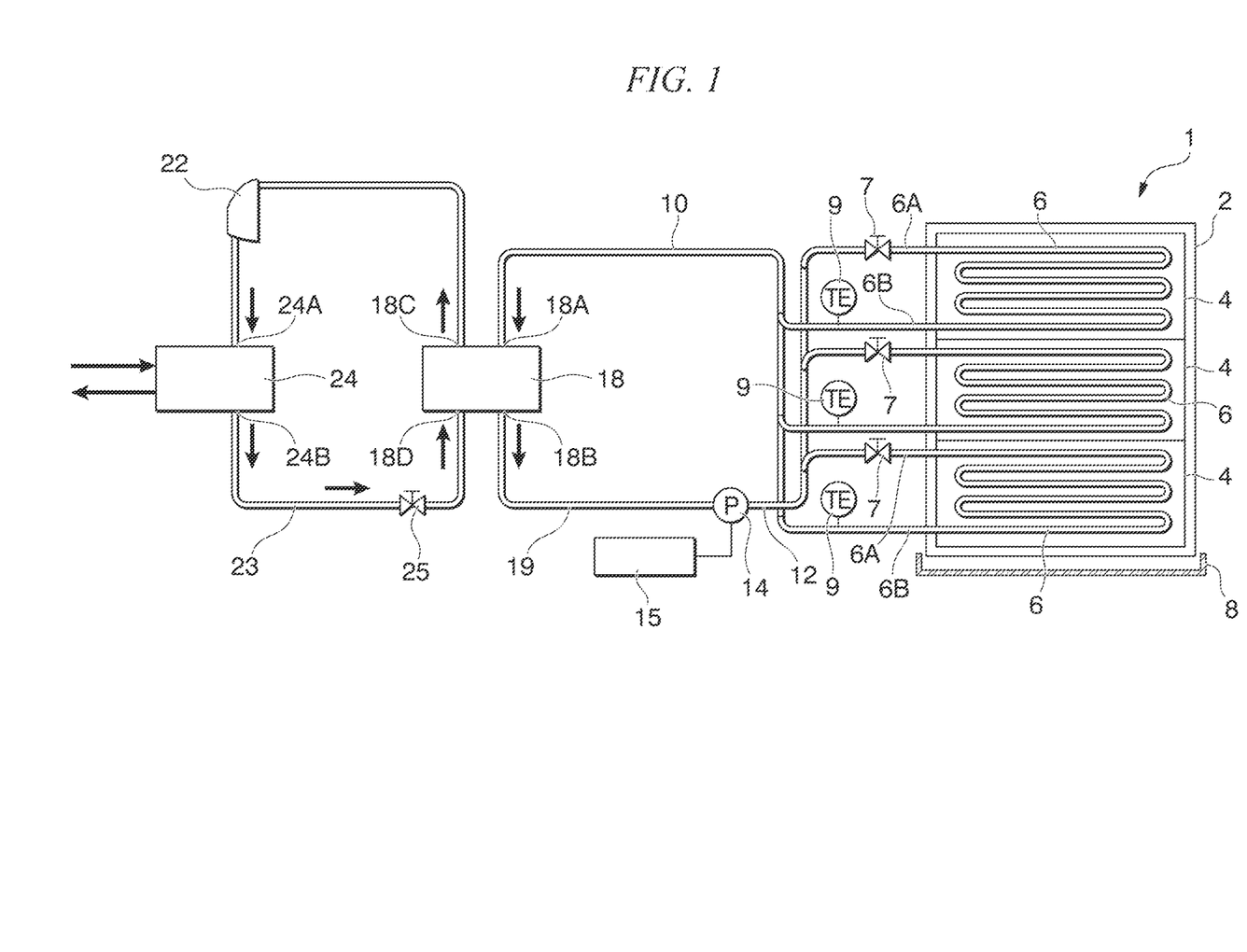
FIG. 1 is a block diagram of an ice making machine according to an embodiment of the present invention.

FIG. 1 is a block diagram of an ice making machine 1 according to a first embodiment of the present invention.

This ice making machine 1 has a cylindrical protective cover 2 disposed with its axis in a vertical state and a cylindrical cooling drum 4 (an ice making unit) disposed concentrically therein, generates ice using almost the entire area of an inner surface of the cooling drum 4 as an ice making surface 4A, and crushes the ice to produce flake ice in a flaky shape.

In this embodiment, a plurality of (three in the drawing, but not limited to this) cooling drums 4 having the same diameter are disposed to be vertically stacked with their axes oriented in a vertical direction without a gap therebetween, and the whole of these cooling drums 4 is covered with the protective cover 2. A heat insulating material (not shown) is filled between the protective cover 2 and the cooling drums 4, and a cold temperature of the cooling drums 4 is maintained. The cooling drums 4 are formed of a metal having excellent corrosion resistance such as stainless steel, although it is not limited, and inside peripheral walls thereof, cryogen flow channels 6 extending in spiral shapes coaxial with central axes of the cooling drums 4 are formed over the entire periphery and almost the entire length in an axial direction.

Each cryogen flow channel 6 has an inlet 6A on an upper side of the cooling drum 4 and an outlet 6B on a lower side thereof; and when liquid carbon dioxide is injected as a cryogen from the inlet 6A, the cryogen spirals the cryogen flow channel 6 and is discharged from the outlet 6B. During that time, some of the cryogen is vaporized, and latent heat thereof is mainly used to cool the ice making surface 4A, which is an inner peripheral surface of the cooling drum 4. The inlet 6A of each cryogen flow channel 6 is connected to a common pipe 12 via a pressure reducing valve 7, and the pipe 12 is connected to a cryogen lead-out part 18B via a pump 14.

The pump 14 pressurizes the liquid carbon dioxide, which is a cryogen, and supplies it to the cryogen flow channel 6 through the pipe 12 and the pressure reducing valve 7. The pump 14 is connected to a control unit 15 including a computer or the like, and a discharge amount of the pump 14 is controlled by an electric signal from the control unit 15. Information such as a temperature and flow rate of each part of the ice making machine is also transmitted to the control unit 15 of this embodiment, and the discharge amount of the pump 14 is controlled based on the control program executed by the computer. In the present invention, an operation of the control unit 15 is not limited to an operation controlled by a computer program, but may be a manual operation in some cases, and may be controlled by an artificial intelligence program that has been machine-learned in advance.

The control unit 15 of this embodiment controls the pump 14 such that the discharge amount of the pump 14 is 1.6 times or more the "total vaporization critical discharge amount." The total vaporization critical discharge amount is a parameter whose value is determined according to performance and operating conditions of the ice making machine. In the present specification, the total vaporization critical discharge amount is defined as a discharge amount that exactly satisfies the following three conditions.

(1) At the inlet 6A of the cryogen flow channel 6, the total amount of the carbon dioxide supplied is liquid.
(2) Inside the cryogen flow channel 6, some of the carbon dioxide is gas and the rest is liquid. That is, it is in a gas-liquid mixed state.
(3) At the outlet 6B of the cryogen flow channel 6, the entire amount of the carbon dioxide becomes gas.

The discharge amount of the pump 14 may be controlled to be 1.6 times or more and less than 3.0 times the total vaporization critical discharge amount. In this case, it is not necessary to increase pressure resistance strength of circulation system equipment such as the cooling drum 4, the pump 14, and a piping system so much, and thus the cost performance including equipment cost is good. Further, in the present embodiment, the discharge amount of the pump 14 may be controlled to be 1.6 times or more and 5 times or less the total vaporization critical discharge amount.

If possible, a state of the cryogen flowing through the inlet 6A of the cryogen flow channel 6, the inside of the cryogen flow channel 6, and the outlet 6B of the cryogen flow channel 6 is observed while the discharge amount of the pump 14 is controlled, as a result, a discharge amount that satisfies the above conditions (1) to (3) may be determined as the total vaporization critical discharge amount, but it is possible to obtain the total vaporization critical discharge amount from heat amount calculation as shown examples which will be described later. That is, the total vaporization critical discharge amount that satisfies the above conditions (1) to (3) is obtained from the amount of ice to be produced by the cooling drum 4 and the latent heat required to produce the ice.

The control unit 15 controls the pump 14 such that the discharge amount of the pump 14 is 1.6 times or more the "total vaporization critical discharge amount," and thus $0.6/1.6=37.5\%$ or more of the liquid carbon dioxide that has passed through the inlet 6A of the cooling drum 4 passes through the outlet 6B in a liquid state. In this way, a relatively large amount of liquid carbon dioxide exceeding 37.5% remains until it reaches the outlet 6B of the cryogen flow channel 6, and thus the cooling drum 4 is cooled mainly using the latent heat of the liquid carbon dioxide.

In the related art, a large amount of a refrigerant is not caused to flow in a liquid state until it reaches an outlet of a cooling unit. This is because it was thought that there was waste in terms of operating cost and that equipment cost such as increasing strength of a circulation system would be excessive. However, according to an experiment conducted by the present inventors, an effect of being able to equalize a temperature of the ice making unit and increase the productivity of ice especially in a case in which ice making is carried out with a cryogen has been found, which was not known in the related art. The present invention has been made based on this viewpoint. For example, in the chlorofluorocarbon direct expansion type of the related art, the discharge amount of the pump is often set to about 0.95 to 1 times the total vaporization critical discharge amount.

In the present embodiment, as compared with a case in which it is necessary to adjust a degree of superheat of the refrigerant and the refrigerant is completely vaporized near an outlet of a refrigerant flow channel as in the chlorofluorocarbon direct expansion type, it is possible to suppress a degree of superheat of the cryogen to zero and uneven cooling is unlikely to occur over the entire length of the cryogen flow channel 6. Therefore, temperature distribution and cooling can be made substantially uniform over the entire area of the wide ice making surface 4A constituted by the three cooling drums 4, and the water supplied from a nozzle 50 can be frozen with a uniform thickness over the entire area of the ice making surface 4A. Accordingly, it is possible to produce flake ice P2 having a uniform ice thickness and a uniform ice quality due to a uniform freezing rate.

In the present embodiment, from the viewpoint of cooling efficiency, the temperature of the cryogen at the inlet 6A of the cryogen flow channel 6 is preferably $-30°$ C. to $-20°$ C., and the pressure of the cryogen at the inlet 6A of the cryogen flow channel 6 is preferably 1.3 MPa to 1.9 MPa. More preferably, the temperature of the cryogen at the inlet 6A of the cryogen flow channel 6 is −26° C. to −23° C., and the pressure of the cryogen at the inlet 6A of the cryogen flow channel 6 is 1.5 MPa to 1.7 MPa. However, the present invention is not limited to these ranges.

Each outlet 6B of each cryogen flow channel 6 is connected to a common pipe 10 via a temperature sensor 9, and the pipe 10 is connected to a cryogen introduction part 18A of an evaporator 18 (a heat exchanger). The temperature sensor 9 measures a temperature (a physical quantity) of a gas-liquid mixture of the cryogen which is discharged from the outlet 6B, generates an electric signal corresponding to the temperature, and transmits this electric signal to the control unit 15. The temperature sensor 9 is also useful for measuring a degree of superheat in the cryogen flow channel 6. The control unit 15 measures a degree of superheat of gaseous carbon dioxide in each cryogen flow channel 6 in response to the signal from the temperature sensor 9, and when the degree of superheat increases, by increasing the discharge amount of the liquid carbon dioxide from the pump 14 for feedback-control, it is possible to keep the degree of superheat within an acceptable range.

The temperature sensor 9 may include a flow velocity sensor or a pressure sensor that senses a flow velocity (a physical quantity) of the cryogen, and in that case, an electric output from the flow velocity sensor and/or the pressure sensor may also be transmitted to the control unit 15. In a case in which the flow velocity and/or the pressure (the physical quantity) measured by the flow velocity sensor and/or the pressure sensor increases, it is determined that a vaporization rate of the cryogen increases, and by increasing the discharge amount of the liquid carbon dioxide from the pump 14 for feedback-control, it is possible to keep the degree of superheat within an allowable range.

The evaporator 18 exchanges heat between the cryogen flowing from the cryogen introduction part 18A to the cryogen lead-out part 18B and a primary refrigerant flowing from a refrigerant introduction part 18D to a lead-out part 18C. In this embodiment, it is preferable to use liquid ammonia as the primary refrigerant. As the primary refrigerant, R404A, $CO_2$, and the like can also be used in addition to the ammonia, but ammonia is most preferable in terms of an operating temperature and a pressure range. Even if toxic and odorous ammonia is used as the primary refrigerant, the ammonia does not affect the ice because carbon dioxide is used as the cryogen and a primary cooling side and a secondary cooling side are completely separated from each other. Therefore, in the present embodiment, it is possible to safely use ammonia which has good cooling efficiency.

The primary refrigerant, some or all of which is vaporized after cooling the cryogen with latent heat, is discharged from the lead-out part 18C of the evaporator 18, and the primary refrigerant is introduced into a compressor 22 via a pipe 20 and is compressed to a predetermined pressure by the compressor 22, and then introduced into a condenser 24 (a primary refrigerant cooler) from a refrigerant introduction part 24A. In the condenser 24, the pressurized and heated primary refrigerant is cooled with water or air, and the cooled and liquefied primary refrigerant flows out from the lead-out part 24B and is introduced into the evaporator 18 from the refrigerant introduction part 18D via a pipe 23 and a pressure reducing valve 25.

In the present embodiment, from the viewpoint of cooling efficiency, the temperature of the primary refrigerant at the refrigerant introduction part 18D of the evaporator 18 is preferably −32° C. to −22° C., and the pressure of the primary refrigerant at the refrigerant introduction part 18D is preferably 0.006 MPa to 0.07 MPa. More preferably, the temperature of the primary refrigerant at the refrigerant introduction part 18D of the evaporator 18 is −28° C. to −25° C., and the pressure of the primary refrigerant at the refrigerant introduction part 18D is 0.03 MPa to 0.05 MPa. However, the present invention is not limited to these ranges.

Next, other embodiments of the present invention will be described with reference to FIGS. 2 and 3. In these embodiments, in addition to the configuration of FIG. 1, a new feature is that a receiver tank 16 for temporarily storing the liquid carbon dioxide is provided on a pipe 19 on an upstream side of the pump 14.

Figure 2:
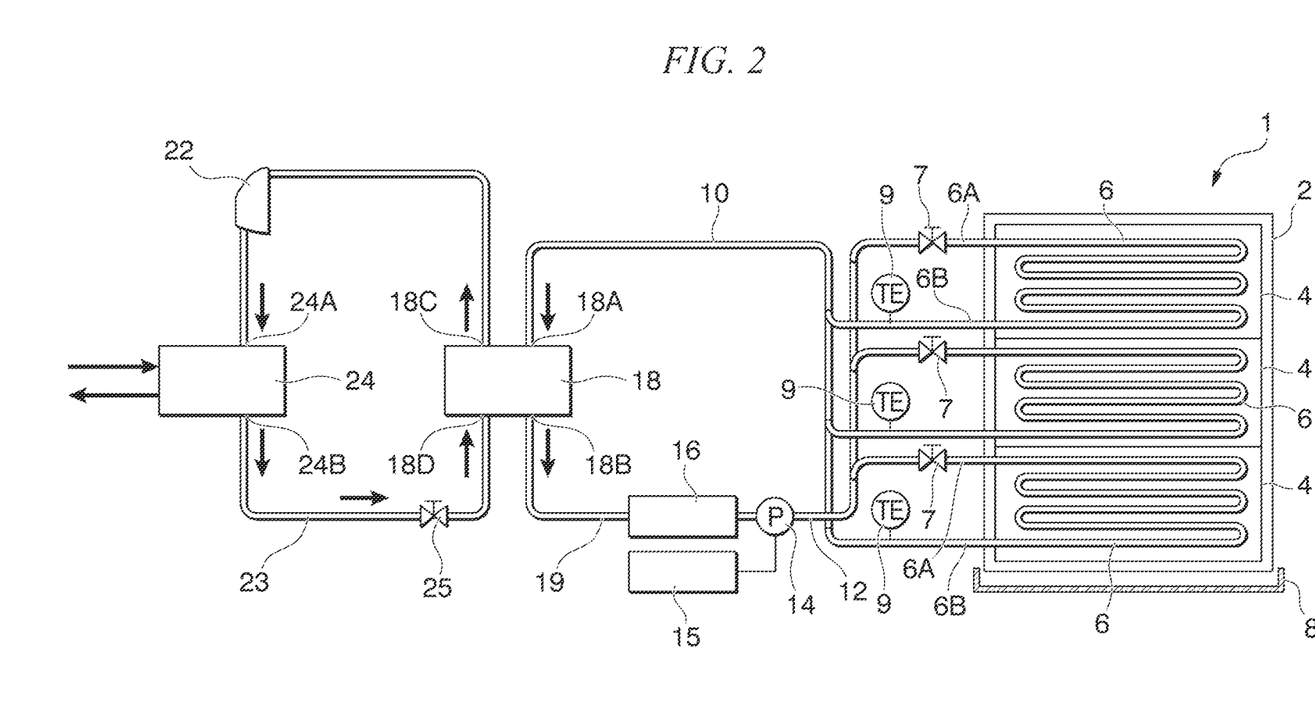
FIG. 2 is a block diagram of a modification example of the ice making machine according to the embodiment of the present invention.

In the embodiment of FIG. 2, the cryogen cooled and liquefied by the evaporator 18 is introduced into the receiver tank 16 via the pipe 19. According to this configuration, by storing the cryogen liquefied by the evaporator 18 in the receiver tank 16, it is possible to separate the cryogen into gas and liquid in the receiver tank 16 and to send only a liquid cryogen to the cryogen flow channel 6 using the pump 14.

Figure 3:
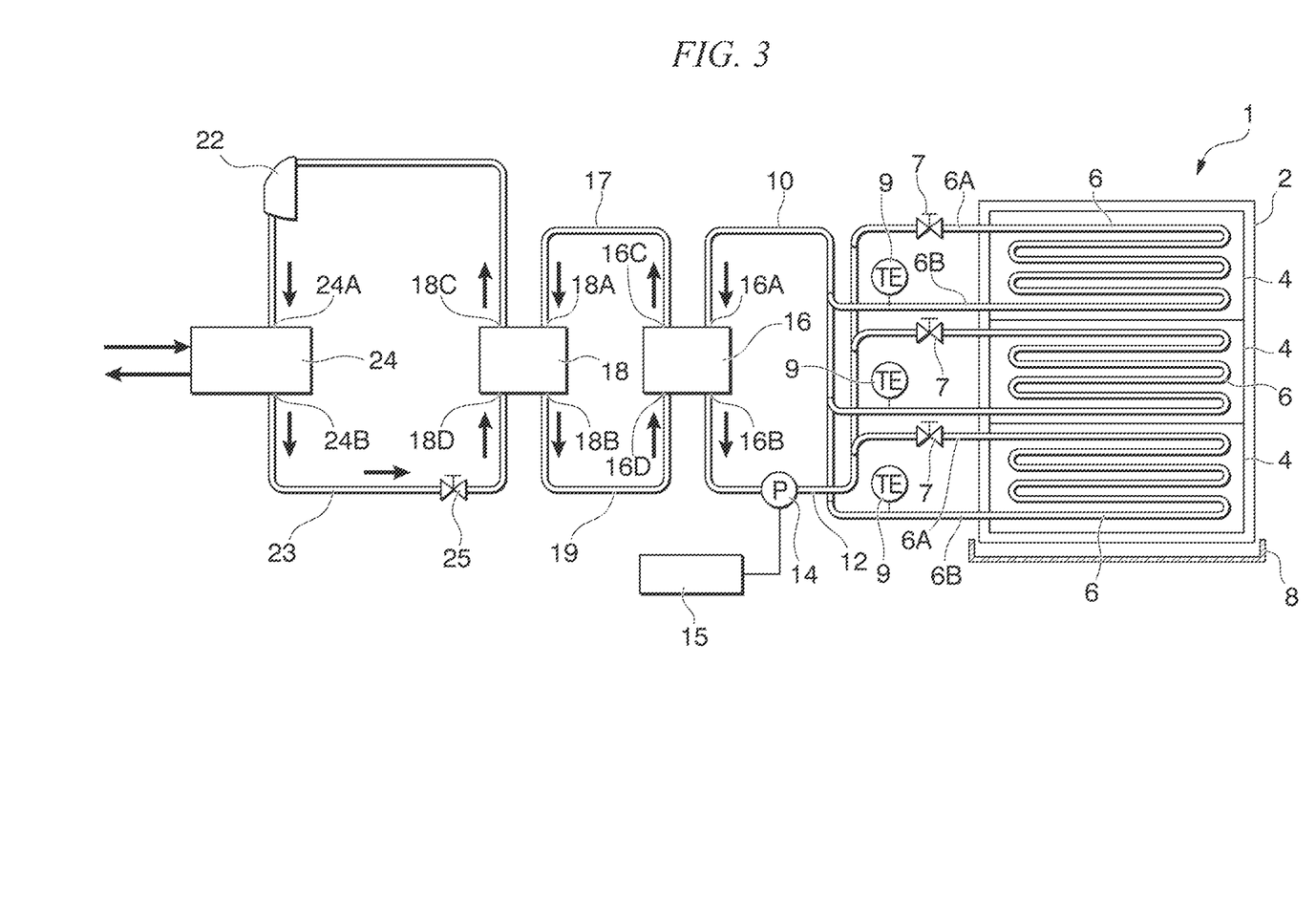
FIG. 3 is a block diagram of a modification example of the ice making machine according to the embodiment of the present invention.

In the embodiment of FIG. 3, a lead-out part 16C of the receiver tank 16 is connected to the cryogen introduction part 18A of the evaporator 18 (the heat exchanger) through a pipe 17, while an introduction part 16D of the receiver tank 16 is connected to the cryogen lead-out part 18B of the evaporator 18 through the pipe 19. As a result, some of the cryogen in the receiver tank 16 passes through the evaporator 18 from the cryogen introduction part 18A via the pipe 17 from the lead-out part 16C and is cooled with the primary refrigerant, which will be described later. The cryogen cooled by the evaporator 18 enters the receiver tank 16 from the introduction part 16D via the pipe 19 from the lead-out part 18B.

The cryogen cooled by the evaporator 18 and the cryogen returned from the cryogen flow channel 6 of the cooling drum 4 are introduced into the receiver tank 16. Inside the receiver tank 16, the cryogen in a gas-liquid mixed state is vertically separated into gas and liquid in the receiver tank 16 by gravity, and only the liquid cryogen is led out from a liquid discharge port 16B and is returned to the cryogen flow channel 6 via the pump 14. Further, some of the gaseous or gas-liquid mixed cryogen in the receiver tank 16 is led out from the lead-out part 16C, and the cryogen is supplied from the cryogen introduction part 18A to the evaporator 18 for cooling and liquefaction.

Figure 4:
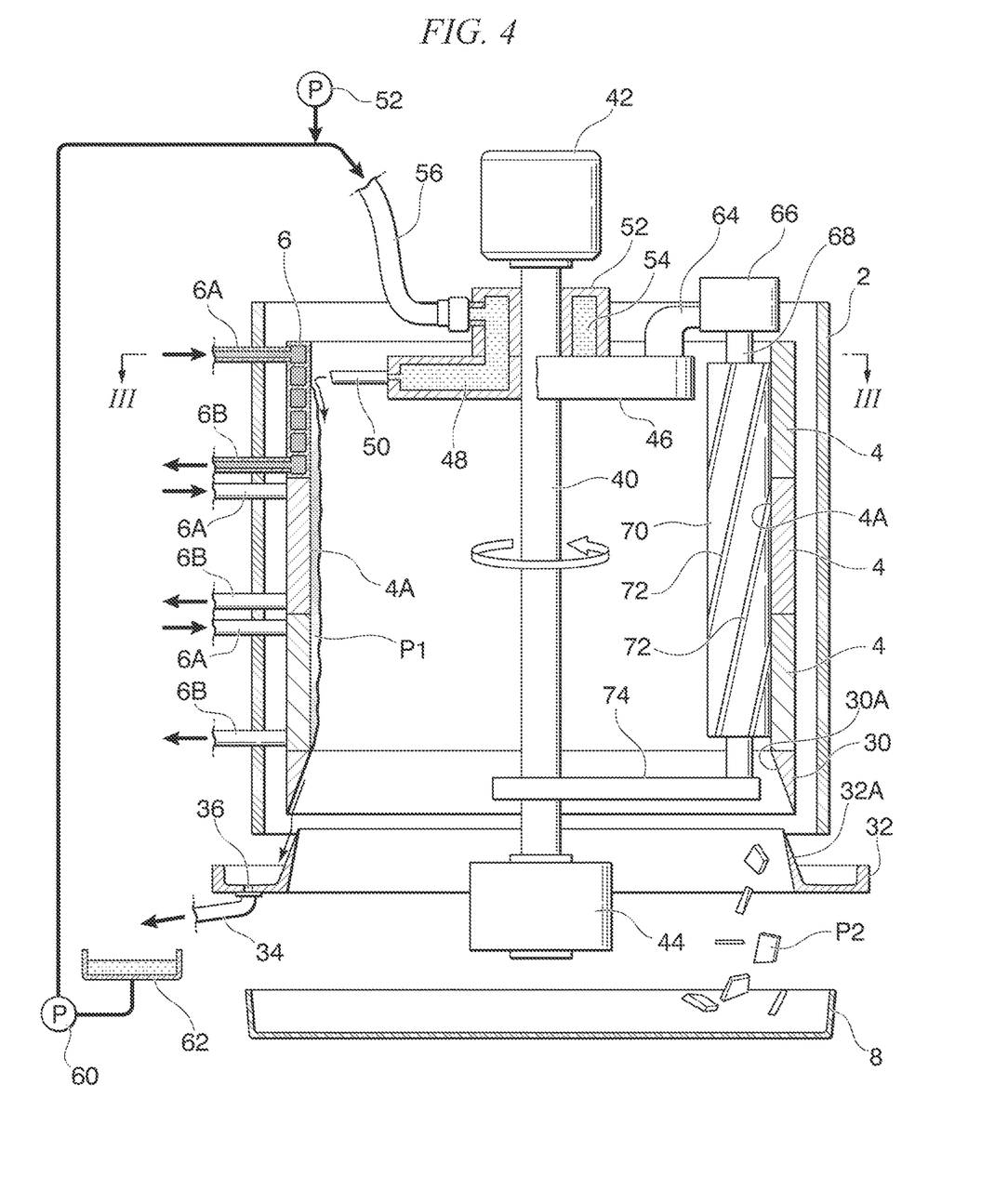
FIG. 4 is a vertical cross-sectional view showing a periphery of a cooling drum of the same embodiment.
Figure 5:
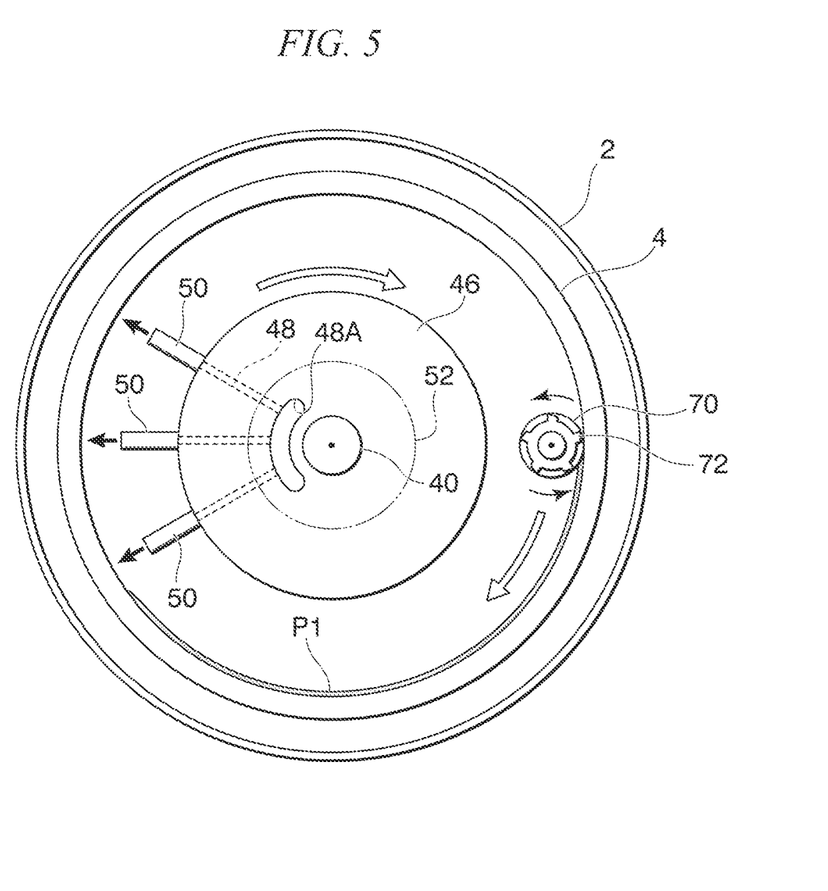
FIG. 5 is a line-of-sight view of III-III in FIG. 4.

Next, the cooling drum 4, which is a cooling unit of the ice making machine 1, and its surroundings will be described with reference to FIGS. 4 and 5. These can be applied to any of the above embodiments of FIGS. 1 to 3. The cooling drum 4 of this example is for continuously producing flaky flake ice P2, but the present invention is not limited to the production of flake ice, and, as will be described later, it can also be used in the production of block ice, plate ice, or ice in other shapes.

As described above, inside the cylindrical protective cover 2, the three cooling drums 4 are disposed to be vertically stacked without a gap. In a peripheral wall part of each cooling drum 4, metal partitions made of stainless steel or the like are arranged in a spiral shape, and thus the cryogen flow channel 6 having a rectangular cross section is formed in a spiral shape, and the inlet 6A and the outlet 6B are formed at a start part and an end part of the cryogen flow channel 6. In this embodiment, the inlet 6A and the outlet 6B are disposed on the same side, but may be oriented in different directions.

A cylindrical drainage part 30 having the same diameter as the cooling drum 4 and coaxial with the cooling drum 4 is attached to a lower end of the lowermost cooling drum 4, and an inner wall surface of the drainage part 30 has an upper end which is located at a position aligned with the ice making surface 4A of the cooling drum 4 in a radial direction and an inclined surface 30A that expands outward as it goes downward. Excess water which is supplied to the ice making surface 4A of the cooling drum 4 and falls along the ice making surface 4A without freezing falls to a position located outside the ice making surface 4A of the cooling drum 4 along the inclined surface 30A of the drainage part 30.

An annular water receiving unit 32 is horizontally disposed below the cooling drum 4, a water receiving wall 32A whose diameter narrows toward an upper end is formed on an inner peripheral side of the water receiving unit 32, and the water falling from the inclined surface 30A comes into contact with the water receiving wall 32A and is collected in the water receiving unit 32. An inner bottom surface of the water receiving unit 32 is slightly inclined toward one side, a drainage port 36 is formed at the lowest position of the water receiving unit 32, and the drainage pipe 34 is connected to a lower surface of the water receiving unit 32. As a result, the water collected in the water receiving unit 32 flows through the drainage pipe 34 via the drainage port 36, is further stored in a water receiving unit 62, is pressurized by a circulation pump 60, and is supplied to a water supply pipe 56 to supply the water to the inner surface of the cooling drum 4. Water is also supplied to the water supply pipe 56 from a raw water supply source (not shown) via a water supply pump 58.

A rotating shaft 40 is disposed along the central axis of the three cooling drums 4, an upper end of the rotating shaft 40 is connected to a motor 42, and a lower end of the rotating shaft 40 is rotatably supported by a hearing 44. A disk-shaped nozzle support unit 46 is horizontally and relatively non-rotatably fixed to the upper part of the rotating shaft 40, and a plurality of (three in this embodiment, but not limited to this) nozzles 50 are radially attached outward from one side of an outer peripheral surface of the nozzle support unit 46. A water flow channel 48 communicating with each nozzle 50 is formed inside the nozzle support unit 46, and, as shown in FIG. 5, an upper end of the water flow channel 48 is open, as a water receiving port 48A, on an upper surface of the nozzle support unit 46.

A ring-shaped water supply unit 52 is liquid-tightly disposed on the nozzle support unit 46 through the rotating shaft 40. The water supply unit 52 is immovable, but the rotating shaft 40 and the nozzle support unit 46 are rotatable relative to the water supply unit 52. A water supply channel 54 which is open on a lower surface of the water supply unit 52 is formed inside the water supply unit 52, and the water supply channel 54 airtightly communicates with the water flow channel 48 regardless of a rotation position of the nozzle support unit 46. A water supply pipe 56 is connected to the water supply unit 52, and the water supplied from the water supply pipe 56 is sprayed outward from a tip end of each nozzle 50 via the water supply channel 54 and the water flow channel 48 and comes into contact with the ice making surface 4A of the cooling drum 4 to flow down. In the process, the water is cooled by the cooling drum 4, and ice P1 having a constant thickness grows on the ice making surface 4A of the cooling drum 4.

A support part 64 and a bearing unit 66 are attached to an end part of the nozzle support unit 46 on a side opposite to the nozzle 50, and the bearing unit 66 rotatably supports an upper end of a rotating shaft 68 of a rotary cutter 70 (a crusher). A lower end of the rotating shaft 68 is rotatable supported by a support arm 74, and the support arm 74 is relatively non-rotatable fixed to a lower part of the rotating shaft 40.

The rotary cutter 70 is disposed vertically along the ice making surface 4A of the cooling drum 4, and a plurality of gentle spiral screw blades 72 are formed on an outer peripheral surface of the rotary cutler 70. The rotary cutter 70 rolls along the ice making surface 4A of the cooling drum 4 as the nozzle support unit 46 rotates, and the screw blades 72 crush the ice P1 deposited on the ice making surface 4A into a flake shape having a size of about several cm on a side. The crushed flake ice P2 falls vertically from the ice making surface 4A of the cooling drum 4 and is collected in an ice storage tank 8.

According to the ice making machine having the above configuration, as shown in FIG. 1, the liquid carbon dioxide is pressurized by the pump 14, is distributed to the three pressure reducing valves 7 through the pipe 12 to be depressurized, and then enters the cryogen flow channel 6 of each cooling drum 4 from each inlet 6A. At the inlet 6A, almost all of the carbon dioxide, which is a cryogen, is liquid. The liquid carbon dioxide cools the cooling drum 4 while spirally flowing through the cryogen flow channel 6, and some of the liquid carbon dioxide is gradually vaporized while generating latent heat.

At this time, the control unit 15 may control the pump 14 such that the discharge amount of the pump 14 is 1.6 times or more the "total vaporization critical discharge amount." In this case, $0.6/1.6=37.5\%$ or more of the liquid carbon dioxide that has passed through the inlet 6A of the cooling drum 4 passes through the outlet 6B in a liquid state. In this way, a relatively large amount of liquid carbon dioxide exceeding 37.5% remains until it reaches the outlet 6B of the cryogen flow channel 6, and thus the cooling drum 4 is cooled mainly using the latent heat of the liquid carbon dioxide.

The evaporator 18 cools the gaseous or gas-liquid mixed carbon dioxide, and the gaseous or gas-liquid mixed primary refrigerant whose temperature has risen thereby is compressed by the compressor 22 through the pipe 20 from the lead-out part 18C and is sent to the condenser 24. The compressed and heated primary refrigerant in a gaseous or gas-liquid mixed state exchanges heat with cold water or air (not shown) in the condenser 24 to become a liquid primary refrigerant and then is again introduced into the evaporator 18 via the pipe 23 and the pressure reducing valve 25.

The present invention is not limited to the above-described embodiments, and any configuration modification can be made within the scope of the claims.

EXAMPLE

Next, an example of the present invention will be described more specifically with reference to an example of thermal power calculation.

It is assumed that the required cooling capacity of a flake ice making machine using the cooling drum of FIGS. 1 to 5 is as follows.

(1) Ice making capacity: 7000 kg/day
(2) Refrigerant temperature
    Primary refrigerant (ammonia) saturation temperature: $-28°$ C.,
    Cryogen (carbon dioxide) saturation temperature: $-25°$ C.
(3) Freezing capacity: 53 kW (liquid carbon dioxide supply temperature: $-25°$ C.)

(4) Raw water temperature: 25° C.
(5) Latent heat of ice: 80 kcal/kg
(6) Supercooling temperature: 0° C.

Under the above conditions, an amount of cooling heat per kg in ice making is as follows.

$q = ((25-0)+80) \times 1 \text{ (kg)} = 105 \text{ (kcal/kg)}$

The freezing capacity required to increase the ice making capacity to 7000 kg/day is as follows.

Freezing capacity (kW) = (7000 (kg) × 105 (kcal/kg))/(860 × 24 H/day) = 35.6 (kW)

An amount of cold heat R (kcal/H) required per hour is as follows.

$R = 7000 \text{ (kg/day)} \times 105 \text{ (kcal/H)}/24 \text{ (H/day)} = 30625$ kcal/H A supply amount of the liquid carbon dioxide required per hour is as follows.

$W(LCO_2) = R/(i_1 - i_2) = 30625/(156.5 - 86.5) = 437.5$ kg/H 437.5 kg/H of the supply amount of the liquid carbon dioxide required per hour is converted to a volumetric flow rate of the liquid carbon dioxide at −25° C. as follows.

$V(LCO_2) = 0.416 \text{ m}^3/\text{H}$

This is the total vaporization critical discharge amount V (m³/H) under the above operating conditions.

Therefore, the discharge amount of the liquid carbon dioxide from the pump 14 required in this embodiment is as follows.

$0.416 \text{ (m}^3/\text{H)} \times 1.6 \text{ or more} = 0.6656 \text{ (m}^3/\text{H)}$ or more In this way, the discharge amount of the liquid carbon dioxide from the pump 14 can be calculated.

In a case in which the discharge amount of the liquid carbon dioxide from the pump 14 changes, how the flow velocity of the gas-liquid mixed carbon dioxide at the outlet 6B of the cooling drum 4 changes is calculated, and it is verified whether or not the flow velocity at the outlet 6B is excessively high, as follows.

Flow Velocity at Outlet 6B at Total Vaporization Critical Discharge Amount V×1 Time (an Example in Related Art)

The flow rate at the inlet 6A of each cooling drum 4 is as follows because there are three cooling drums 4.

$0.416 \text{ (m}^3/\text{H)}/3 = 0.139 \text{ (m}^3/\text{H)}$

In this case, the entire amount of the carbon dioxide becomes gas at the outlet 6B of each cooling drum 4. Since a gas specific volume of the gaseous carbon dioxide at −25° C. = 0.0228 m³/kg, the flow rate of the gaseous carbon dioxide at −25° C. is as follows.

Gas flow rate = 437.5 (kg/H) × 0.0228 (m³/kg) = 99.75 (m³/H)

Therefore, the gas flow velocity at the outlet 6B is as follows.

9.975 (m³/H)/(3×3600)/(0.0275 m×0.017 m) (cross-sectional area of cryogen flow channel 6) = 1.975 (m/s)

Flow Velocity at Outlet 6B at Total Vaporization Critical Discharge Amount V×2 Times (Example 1)

In this case, ½ amount of the carbon dioxide becomes gas at the outlet 6B of each cooling drum 4. Therefore, the flow velocity of the gas-liquid mixture at the outlet 6B is as follows.

(0.416 (m³/H) + 9.975 (m³/H))/(3×3600) = 2.06 (m/s)

Flow Velocity at Outlet 6B at Total Vaporization Critical Discharge Amount V×3 Times (Example 2)

In this case, ⅓ amount of the carbon dioxide becomes gas at the outlet 6B of each cooling drum 4. Therefore, the flow velocity of the gas-liquid mixture at the outlet 6B is as follows.

(0.416 (m³/H) × 2 + 9.975 (m³/H))/(3×3600) = 2.14 (m/s)

Flow Velocity at Outlet 6B at Total Vaporization Critical Discharge Amount V×4 Times (Example 3)

In this case, ¼ amount of the carbon dioxide becomes gas at the outlet 6B of each cooling drum 4. Therefore, the flow velocity of the gas-liquid mixture at the outlet 6B is as follows.

(0.416 (m³/H) × 3 + 9.975 (m³/H))/(3×3600) = 2.22 (m/s)

As can be seen from the above calculation, even if the discharge amount from the pump 14 increases from 1 to 4 times the total vaporization critical discharge amount V, the flow velocity of the gas-liquid mixture at the outlet 6B increases no more than 1.124 times. Therefore, an excessive load is not applied to each part of the ice making machine.

Next, Table 1 shows the appropriateness of the flow rate in a case in which the total vaporization critical discharge amount (a $CO_2$ pump flow rate) is 9.3 L/min. It is understood that there is a difference in an ice making quantity at a boundary of 9.3 (L/min) × 1.6 = 14.8 (L/min), which is 1.6 times or more the total vaporization critical discharge amount, as described in the embodiment of the present invention. In the example, in a case in which the pump discharge amount is 15.2 L/min, which is 1.6 times or more the total vaporization critical discharge amount, the ice making quantity is 9888 kg/day, and in a case in which the pump discharge amount is 14.5 L/min, which is less than 1.6 times the total vaporization critical discharge amount, the ice making quantity is 8256 kg/day.

TABLE 1

| $CO_2$ saturation temperature [° C.] | Ice making quantity [kg/day] | $CO_2$ pump flow rate [L/min] | Supplied water temperature [° C.] | Ice thickness [mm] |
| --- | --- | --- | --- | --- |
| −23.9 | 9504 | 20.5 | 16.2 | 1.4~1.6 |
| −24.5 | 9504 | 17.5 | 15.7 | 1.3~1.5 |
| −24.3 | 9600 | 16.6 | 16.6 | 1.5~1.7 |
| −25.0 | 9888 | 15.2 | 14.3 | 1.5~1.7 |
| −25.0 | 8256 | 14.5 | 16.3 | 1.5~1.7 |
| −25.0 | 8448 | 14.2 | 14.1 | 1.5~1.7 |
| −25.0 | 7968 | 10.8 | 16.4 | 1.5~1.7 |

Total vaporization critical discharge amount: 9.3 L/min (ice making quantity: 10000 kg/day, supplied water temperature: 20° C.)

Figure 6:
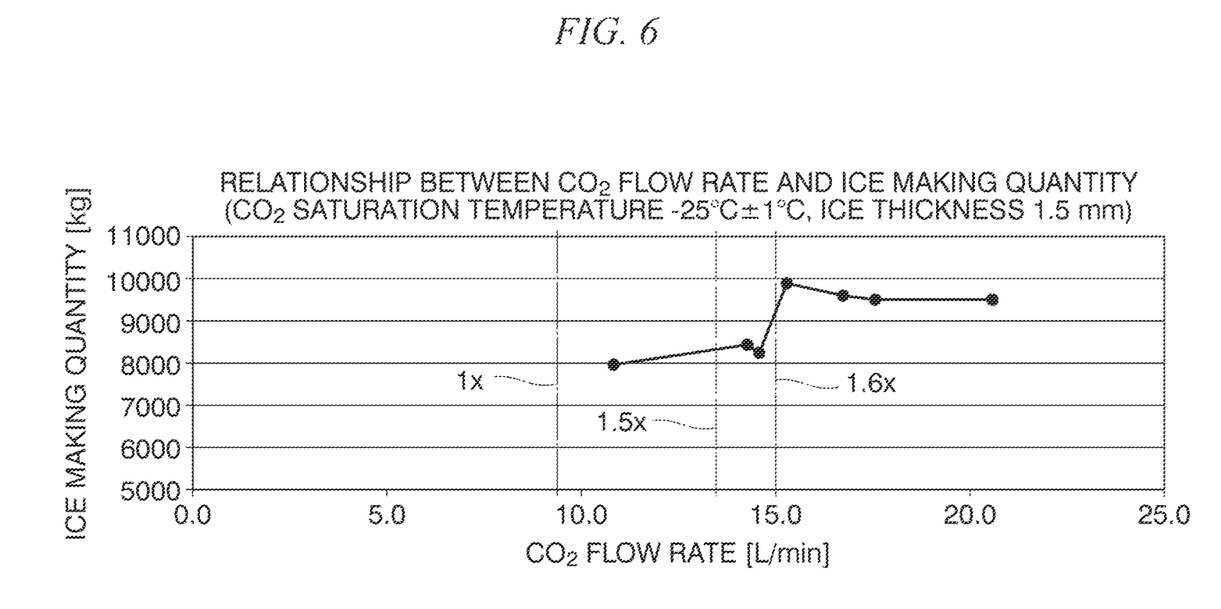
FIG. 6 is a graph showing effects of examples of the present invention.

Next, FIG. 6 is a graph showing the relationship between the flow rate of the carbon dioxide as a cryogen and the ice making quantity, and measuring was performed under the following conditions. An apparatus used is the same as that in the embodiments shown in FIGS. 1 and 4.
(1) Ice making capacity: 10000 kg/day
(2) Refrigerant temperature
Primary refrigerant (ammonia) saturation temperature: −28° C.,
Cryogen (carbon dioxide) saturation temperature: −25° C.
(3) Freezing capacity: 53 kW (liquid carbon dioxide supply temperature: −25° C.)

(4) Raw water temperature: 25° C.
(5) Latent heat of ice: 80 kcal/kg
(6) Supercooling temperature: 0° C.
(7) Flake ice thickness: 1.5 mm As shown in FIG. 6, the ice making quantity tends to increase discontinuously in a flow rate range which is 1.6 times the "total vaporization critical discharge amount," and then gradually decrease. Such a tendency has not been known in the past, and a remarkable effect of the present invention could be confirmed.

INDUSTRIAL APPLICABILITY

According to the ice making machine of the present invention, ice making unevenness on the ice making surface can be decreased, ice production efficiency can be increased, energy can be saved, and high quality ice can be produced. Therefore, the present invention can be used industrially.

REFERENCE SIGNS LIST

1 Ice making machine
2 Protective cover
4 Cooling drum (ice making unit)
6 Cryogen flow channel
8 ice storage tank
6A Inlet
6B Outlet
7 Pressure reducing valve
8 ice storage tank
9 Temperature sensor
10 Pipe
14 Pump
15 Control unit
16 Receiver tank
18 Evaporator (heat exchanger)
20 Pipe
22 Compressor
24 Condenser (primary refrigerant cooler)
30 Drainage part
32 Water receiving unit
32A Water receiving wall
34 Drainage pipe
36 Drainage port
40 Rotating shaft
42 Motor
44 Bearing
46 Nozzle support unit
48 Water flow channel
48A Water receiving port
50 Nozzle
52 Water supply unit
54 Water supply channel
56 Water supply pipe
58 Water supply pump
60 Circulation pump
62 Water receiving unit
64 Support part
66 Bearing unit
68 Rotating shaft
70 Rotary cutter (crusher)
72 Screw blade
74 Support arm
P1 Ice
P2 Flake ice

What is claimed is:

1. An ice making machine comprising:
an ice making unit that includes an ice making surface and a cryogen flow channel through which a cryogen for cooling the ice making surface flows;
a water supply mechanism that supplies water from a nozzle to the ice making surface;
a heat exchanger for cooling the cryogen flowing out from an outlet of the cryogen flow channel;
a pump that pressurizes and discharges the cryogen cooled by the heat exchanger; and
a control unit that includes a computer and controls a discharge amount of the pump based on a control program executed by the computer,
wherein the cryogen is carbon dioxide, and
wherein the control unit controls the pump such that the cryogen is in a gas-liquid mixed state at the outlet of the cryogen flow channel, and
in a case in which the discharge amount of the pump at which a total amount of the carbon dioxide is liquid at an inlet of the cryogen flow channel and a total amount of the carbon dioxide becomes gas at the outlet of the cryogen flow channel is a total vaporization critical discharge amount, the control unit controls the pump such that the discharge amount of the pump is 1.6 times or more the total vaporization critical discharge amount.

2. The ice making machine according to claim 1, further comprising a pressure reducing valve that reduces a pressure of the cryogen discharged by the pump.

3. The ice making machine according to claim 1, further comprising a receiver tank that stores the carbon dioxide that is cooled and liquefied by the heat exchanger.

4. The ice making machine according to claim 1,
wherein the heat exchanger has a primary refrigerant flow channel through which a cooled primary refrigerant passes and a cryogen introduction part through which the cryogen passes from the outlet of the cryogen flow channel and exchanges heat between the primary refrigerant passing through the primary refrigerant flow channel and the cryogen passing through the cryogen introduction part, and
wherein the ice making machine further comprises a primary refrigerant cooler for supplying the primary refrigerant to the primary refrigerant flow channel.

5. The ice making machine according to claim 1, further comprising:
a sensor that measures a physical quantity of the cryogen flowing out from the outlet of the cryogen flow channel and outputs a signal corresponding to a gas-liquid mixing ratio of the cryogen,
wherein, in a case in which the discharge amount of the pump at which a total amount of the carbon dioxide is liquid at an inlet of the cryogen flow channel and a total amount of the carbon dioxide becomes gas at the outlet of the cryogen flow channel is a total vaporization critical discharge amount,
the control unit feedback-controls the pump based on the control program executed by the computer, such that the discharge amount of the pump is 1.6 times or more the total vaporization critical discharge amount by increasing the discharge rate of the pump when the vaporization rate of the cryogen increases, in response to the signal from the sensor.

6. The ice making machine according to claim 1,
wherein the ice making unit has a cylindrical cooling drum, the cryogen flow channel is formed inside the cooling drum, and the ice making surface is formed on an inner surface of the cooling drum, wherein the water supply mechanism has a nozzle that sprinkles water on the ice making surface of the cooling drum while rotating around a center line of the cooling drum, and wherein the ice making machine further comprises a crusher for crushing ice adhering to the ice making surface of the cooling drum.

7. The ice making machine according to claim 1, wherein the ice making unit has an ice making plate having the cryogen flow channel inside, one surface of the ice making plate is an ice making surface, and another surface of the ice making plate is a heat medium supply surface, and wherein the ice making machine further comprises a heat medium supplier that supplies a heated heat medium to the heat medium supply surface.

\* \* \* \* \*